United States Patent
King et al.

(10) Patent No.: US 8,605,009 B2
(45) Date of Patent: Dec. 10, 2013

(54) IN-VEHICLE DISPLAY MANAGEMENT SYSTEM

(75) Inventors: Anthony Gerald King, Ann Arbor, MI (US); Brian Bennie, Sterling Heights, MI (US); Jeffrey Thomas Remillard, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 12/960,526

(22) Filed: Dec. 5, 2010

(65) Prior Publication Data

US 2012/0139816 A1  Jun. 7, 2012

(51) Int. Cl.
*G09G 5/00* (2006.01)

(52) U.S. Cl.
USPC .................................. 345/8; 349/11

(58) Field of Classification Search
USPC .............. 345/7, 1.1–9; 349/11; 340/901–905, 340/933–943
See application file for complete search history.

(56) References Cited

U.S. PATENT DOCUMENTS

| | | | | |
|---|---|---|---|---|
| 4,630,043 A | * | 12/1986 | Haubner et al. | 340/461 |
| 5,006,829 A | * | 4/1991 | Miyamoto et al. | 340/459 |
| 5,831,584 A | * | 11/1998 | Socks et al. | 345/8 |
| 6,091,546 A | | 7/2000 | Spitzer | |
| 6,384,741 B1 | | 5/2002 | O'Leary, Sr. | |
| 7,400,233 B2 | * | 7/2008 | Kondo | 340/435 |
| 2007/0273610 A1 | | 11/2007 | Baillot | |
| 2008/0278821 A1 | | 11/2008 | Rieger | |

FOREIGN PATENT DOCUMENTS

EP  1510849 A1  8/2004

OTHER PUBLICATIONS

Flir Pathfindir Driving System, armoroutlet.com Vehicle/Traffic Accessories, 2005.
Enrico Costanza, Samuel A. Inverso, Elan Pavlov, Rebecca Allen, Pattie Maes, Eye-Q: Eyeglass Peripheral Display for Subtle Intimate Notifications, ACM International Conference Proceeding Series; vol. 159, 2006.

* cited by examiner

*Primary Examiner* — Stephen Sherman
(74) *Attorney, Agent, or Firm* — Joseph R. Root

(57) ABSTRACT

A system and method for displaying information within a vehicle is described. The system includes at least one sensing device detecting a set of data associated with the vehicle, driver, or surroundings, which is processed using a processing unit for identifying a set of information to be displayed. The system also includes a set of display devices coupled to the vehicle. A router selects one or more display devices for displaying the display element based on a set of conditions. A display control unit generates an appropriate display element for the set of information identified and the selected display.

1 Claim, 2 Drawing Sheets

IN-VEHICLE DISPLAY MANAGEMENT SYSTEM

BACKGROUND

This application relates generally to the field of display devices and more particularly to controlling in-vehicle display devices.

In conventional vehicles, such as cars and trucks, the driver observes the surrounding environment either directly or indirectly using windows or mirrors. Moreover, the driver observes several displays that provide information about the status of the vehicle and the external environment, such as speedometers, odometers, fuel status indicators, and warning/alert lights informing about a collision. These display systems provide information through different types of cues, such as visual images, buzzers, or voice prompts that engage the driver in recommendations and activities.

It is known that the driver observes visual cues through various display screens such as an instrument panel, or a center cluster. The driver may temporarily glance away from the road to read the information appearing on these display due to their locations in the vehicle.

Heads-up-displays (HUDs) can be used to present information to the driver in a manner that allows them to keep their eyes focused on the road. Typically, HUDs project virtual images that are reflected from the windshield or from a combiner mounted on the instrument panel. These virtual images can be viewed with only a small downward glance of the driver's eyes, minimizing the need for the driver to refocus his eyes. One limitation of these displays is that the HUD volume increases rapidly with the desired field-of-view (FOV). Larger HUDs are extremely difficult to package in typical automotive instrument panels. Typical instrument panel configurations limit the HUD horizontal FOV to approximately 15 degrees or less.

In addition to traditional automotive HUDs, a variety of wearable or Head-Mounted displays (HMD) are employed that can present information to the driver over a wide field-of-view. The display elements can be superimposed over the driver's view of the external environment. Wearable displays can take the form of glasses that are attached to the driver's head and project images on the transparent lenses that form the glasses. Since typical HMD implementations would replace most of the conventional gages and displays in the vehicle, HMD displays indicators in the driver's field of vision at all times. This might distract the driver when she is under a high workload (i.e., stressed due to heavy traffic, or in bad weather) given the increasingly complex information available to the driver from vehicle safety systems, infotainment devices, and so on.

It would be highly desirable to have an efficient system that intelligently selects an appropriate display device to present relevant information while maximizing the driver's attention on the road.

SUMMARY

One embodiment of the present application describes a display system for a vehicle. The system includes at least one sensing device detecting a set of data associated with the vehicle, driver, or surroundings and a set of display devices coupled to the vehicle. A processing unit processing data gathered through the sensing device for generating a set of information to be displayed, and a router selects one or more display devices for providing the display element based on a set of conditions. Further, a display control unit generates a display element corresponding to the set of information processed as directed by the router.

Another embodiment of the present application discloses a method for displaying information in a vehicle. The method includes detecting a set of parameters associated with the vehicle, driver, or surroundings and processing these parameters to identify a set of information to be displayed. Subsequently, one or more display devices are selected based on a set of conditions and the set of information in converted into display elements. Finally, the method includes displaying the information using the display devices selected.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems for displaying information to a driver through one or more display devices, which are appropriately selected by a router. To this end, a set of sensors and systems gather data associated with the vehicle, driver, and surroundings; and a processing unit processes this data to generate valuable information, which may subsequently be converted into display information using a display control unit. The router then directs this display information to one or more appropriate display devices based on a set of conditions such as available display devices, sensitivity of the information, and driver's state.

Apart from the known in-vehicle display devices, such as instrument clusters, center-stack screens, and HUDs, the present disclosure also employs a HMD or wearable display in the form of glasses to provide a convenient means of information display. The wearable display allows the driver to be notified of items of interest in the field of vision on the transparent screen of the spectacles. Consequently, the driver maintains focus on the road ahead, improving her reaction time. This display would overlay vehicle information, highlight objects of interest to improve visibility, recommend driving actions to avoid potential accidents, overlay turns and directions for navigation, and other information in the driver's field of vision.

Further, the router chooses a combination of available display devices to provide the most appropriate information to the driver without crowding her field of vision. The router selects these display device(s) based on a set of conditions such as the driver's workload, information to be display, and the surrounding conditions. For example, the system may route safety related warnings/alerts to the wearable display and other vehicle information, such as current playing music, and ambient temperature, may be displayed on the center-stack screen.

Exemplary Embodiments

Figure 1:
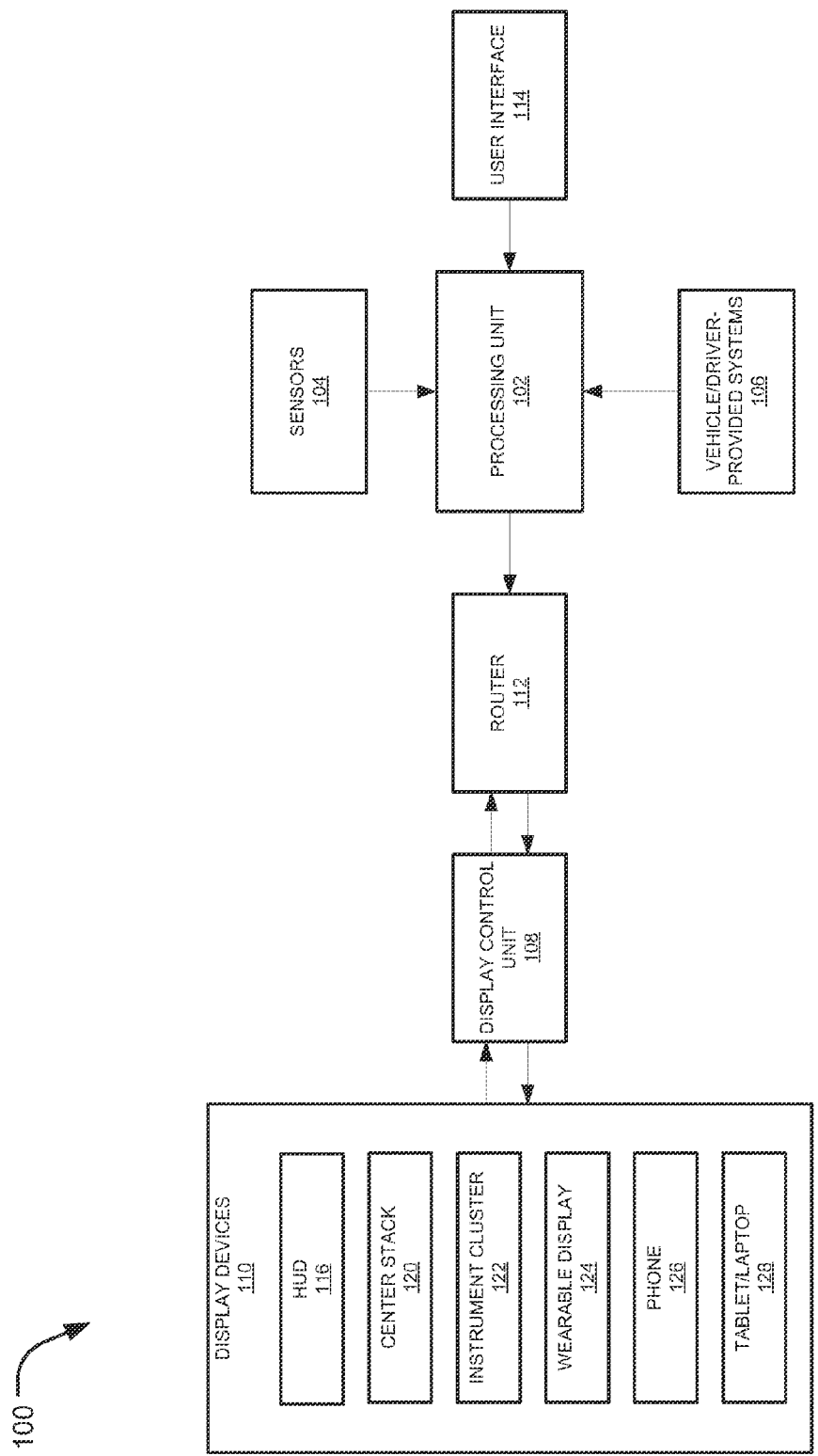
FIG. 1 is an exemplary embodiment of a display system providing relevant information to a driver.

FIG. 1 illustrates an exemplary display system 100 providing relevant information to a driver. The display system 100 includes a processing unit 102 coupled to a set of sensing devices that gather data associated with the vehicle, driver, and surroundings. The sensing devices may include a set of the sensors 104 and various vehicle/driver-provided systems 106 that may identify vehicle and environmental information that the driver may wish to observe. The vehicle/driver-provided systems 106 may potentially provide relevant information to the driver such as vehicle safety systems, cell phones, and navigation systems. The processing unit 102 processes this gathered data into relevant information, which may be converted into displayable information using a display control unit 108. The display system 100 routes this information to a set of display devices 110 through a router 112. The processing unit 102 may also include a user interface 114 for receiving driver inputs. Those skilled in the art will appreciate that the terms "driver" and "user" refers to the occupant of the vehicle who may want to view information on the display devices 110. These terms are interchangeably used throughout this disclosure.

Sensors 104 are devices capable of detecting data associated with the driver, surroundings, and vehicle. Typical sensors 104 may include radars, cameras, and ultrasonic sensors, and so on. Generally, sensors are chosen with a view to gather useful information about the vehicle, its environment, and the driver. For example, an ultrasonic sensor can provide useful information about the proximity of another vehicle or the curb during parking operations. The sensors 104 can be mounted, as known in the art, in locations convenient for gathering the applicable data. In addition, the sensors 104 may be traditional vehicle instruments, such as speedometers, tachometers, engine indicators, or others that communicate vehicle state, or they may be innovative devices such as a video camera.

The sensors 104 not only detect the vehicle and surrounding conditions, but also assemble data associated with the driver. To this end, a line of sight sensor, which may be a camera observing the head movements of the driver, may be employed for detecting a line of sight of the driver. The driver's head movement can also be detected using an angular velocity sensor, a geomagnetic sensor, or a radio sensor mounted on the head. In addition, eye tracking modules known in the art may also be employed to measure the coordinates of the user's pupil, to identify the direction in which the driver is looking.

Vehicle/driver-provided systems 106 may include any device or module that may communicate information to the driver, or which the driver may wish to observe while driving, such as active assistance devices and in-vehicle entertainment devices. In general, these devices may include navigation systems, parking assistance systems, or night vision systems. In addition, the driver may use additional devices in the vehicle such as a phone, music system, or a laptop/tablet. The system 100 ensures sensing relevant information through these driver provided systems and subsequently, displayed to the driver. These in-vehicle devices and driver provided devices are collectively referred to as the vehicle/driver-provided systems 106 in the present disclosure.

The processing unit 102 receives data from the sensors 104 and the vehicle/driver-provided systems 106, and displays relevant information using the display devices 110. As discussed, the driver obtains information from a number of vehicle/driver-provided systems 106 and the sensors 104. The processing unit 102 combines information display requests from the sensors 104, the vehicle/driver-provided systems 106, and the user interface 114 to identify all displayable information that needs to be passed on to one or more display devices 110. For example, navigation instructions, fuel level, or incoming call information can be passed from the navigation system, driver information system, or the phone, respectively, to a wearable display. The communication between the processing unit 102, and the sensors 104 and the vehicle/driver-provided systems 106 may be maintained through a wired, wireless, or broadcasting channel.

Additionally, the processing unit 102 determines the driver's state using the sensors 104 and the vehicle/driver-provided systems 106. To this end, the sensors 104 assist in identifying driver's behavior such as attentiveness and workload. Moreover, surrounding conditions and vehicle state may provide information about driver's state. In general, driver's current state is useful in determining the information to be displayed. For example, a driver looking away from the current driving lane may indicate non-attentive behavior. In this state, the processing unit 102 may display possible lane change indicators. Similarly, if the sensors detect heavy traffic condition, the processing unit 102 may deduce that the driver is under high workload, and subsequently refrain from displaying any indicators unless absolutely necessary.

The display devices 110 present the displayable information assembled by the processing unit 102. In general, the display devices 110 may include any known vehicle display devices such as a Heads-up display (HUD) 116 mounted in the upper instrument panel, a center stack 120, and an instrument cluster 122. The present disclosure also provides a wearable display 124 implemented in the form of spectacles or goggles. The term "wearable display" also referred to as an HMD is small, lightweight "wearable" pair of glasses having a transparent screen. It should be understood that the terms "HMD" and "wearable display" are interchangeably used throughout this disclosure. These display devices 110 may present information about the vehicle, and its surroundings.

The wearable display 124 displays information in predetermined portions of the driver's field of view defined by the lenses of the spectacles. The information provided by the wearable display 124 allows user to concentrate on the road with substantially low refocusing time. For example, night vision imagery can be converted to only highlight the relevant vehicle or pedestrian on the wearable display 124 without displaying a separate image that the driver needs to correlate. The wearable display 124 may be battery operated for wireless operation, and it may be charged using an inductive pad or a wired transformer. The inductive pad could be placed in the driver headrest so the wearable display 124 may be charged while driving.

Providing display information through the wearable display 124 or selected number of display devices 110 may reduce the number of displays that the driver needs to observe. Further, the display devices 110 may include an audio device to provide audible information to the driver.

The router 112 arbitrates the information display requests collected by the processing unit 102 for routing information to one or more display devices 110. The router 112 uses a set of criteria associated with the driver state, the vehicle state, the surroundings, and the display element to select an appropriate display device 110 that maximize driver awareness and enhances driving convenience. The criteria may include, but is not limited to, the type of the available display devices, sensitivity of the display information, the driver's choice of display mode, driver's state, environmental state, or preconfigured settings. In an embodiment of the display system 100, the router 112 may project all the display elements to a single display device, such as the wearable display 124. Alternatively, the display information may be distributed among multiple display devices 110 based on the set of criteria.

For instance, under normal driver workload and attentiveness, and nominal traffic conditions, the router 112 may send the simultaneous requests for display of incoming phone calls, radio station metadata, vehicle speed, low fuel warning, and navigation turn instructions all to the wearable display 124. If the driver, however, is under heavy workload and the traffic is very congested, the router 112 may decide to not display an incoming phone call and direct it straight to voicemail, display radio station song metadata only in the center stack display 120, display vehicle speed, and low fuel warnings using the instrument cluster 122, and display navigation turn instructions and highlight the vehicle immediately ahead in the wearable display 124 to only display the most pertinent driver information into the driver field of vision.

In general, the driver's state and preferences are estimated before selecting a display device 110. As discussed, the processing unit 102 identifies driver's state using the line of sight sensors and surrounding information. In case the driver's workload is high, only highly critical information may be displayed on the wearable display 124, and the rest of the information may be shown through the HUD 116, the instrument cluster 122, or a combination of these devices. In addition, the driver may manually choose the preferred display devices 110 for particular information or may prefer to route all the display information to the desired device 110. In another implementation, the driver may pre-configure the routing criteria or send a request for particular information on a selected display device. Those skilled in the art will appreciate that the router 112 may override the user's selections or pre-configured settings to ensure driver's safety. For example, the driver's selection of receiving all the elements on the wearable display 124 may be modified on the fly in case the driver's workload is high.

The sensitivity of the information also assists in determining an appropriate display device. For example, the display elements are presented in such a way that the information of critical importance is displayed on the wearable display 124 closer to the driver direct line of sight and rapidly accessible. Information not critical for safety can be displayed in marginal regions of the field of view such as at the top (superimposed on the rear view mirror) or at the bottom (possibly superimposed over the center stack).

An analysis of surrounding conditions may also assist in selecting appropriate display devices 110. Heavy traffic conditions may require the driver to focus his attention on the road, and thus the router 112 may decide to display only critical safety-related visual cues to the driver. Other information may either be aborted or displayed on devices that do not obstruct the driver's view. As a result, the router 112 ensures that the display information is selectively positioned within the field of view of the driver among one or more display devices 110, optimizing the visibility and usability of the information presented.

The display control unit 108 generates display elements for each of the display devices 110 as directed by the router 112. The information gathered by the processing unit 102 is converted to displayable elements such as navigation arrows and warning signs. Subsequently, the display devices 110 present the display elements. The display control unit 108 may use known techniques to generate display elements for various types of display devices 110. For example, if the router 112 decides that navigation instructions need to be displayed on the HUD 116, the display control unit 108 generates images appropriate for display in the HUD 116. On such technique uses pico-projections that use laser light to overlay display elements on the wearable display 124.

Display control unit 108 ensures an image display that maintains the driver's attention on the road. If the processing unit 102 sends information to the wearable display 124, the display control unit 108 determines the appropriate location within the display and generates the display elements accordingly. In addition, combining the line of sight information, the display control unit 108 may provide display elements adapted to the current line of sight of the driver. The display element can be projected in a direction approximately opposite to the direction of head orientation change. Consequently, when the driver's head moves, for example, to the right, the display on the wearable display 124 moves to the left.

Figure 2:
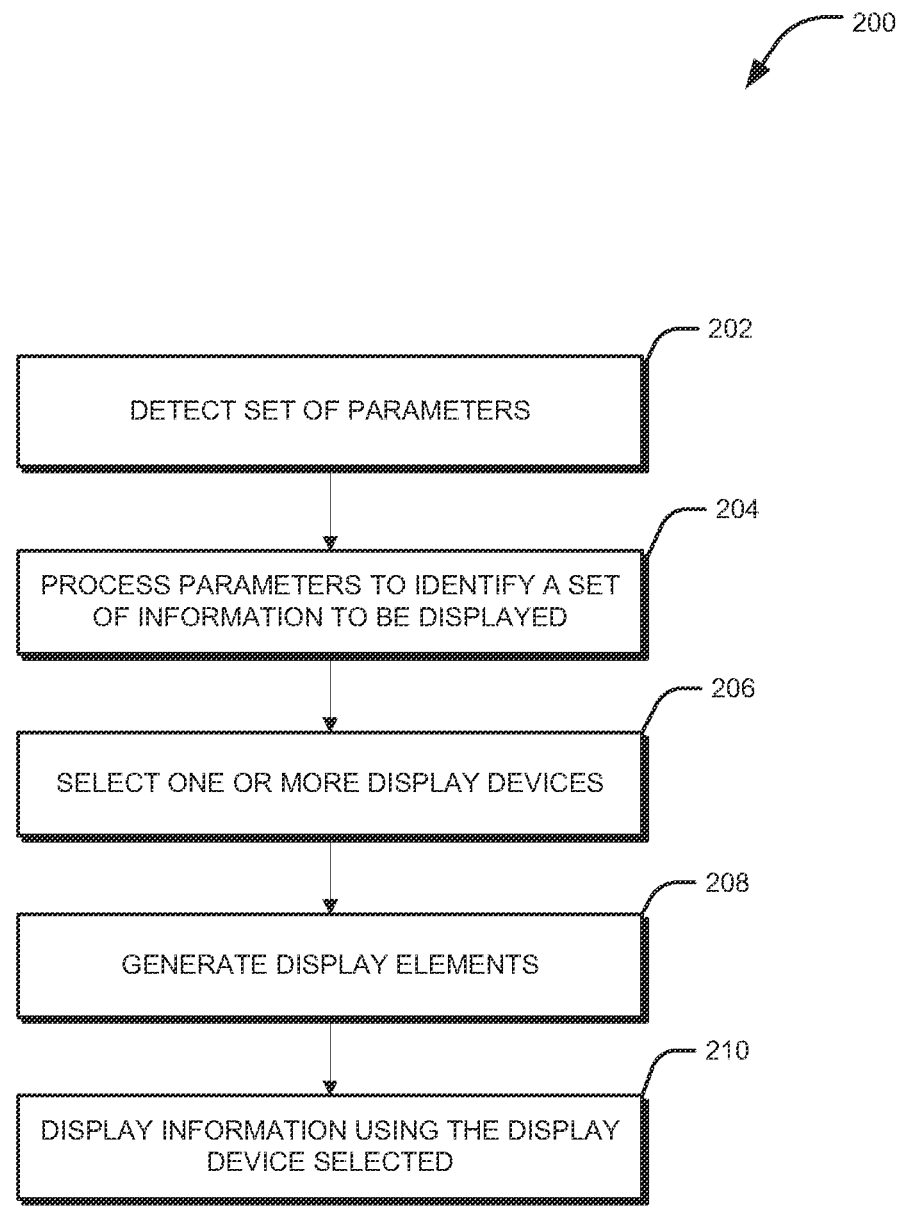
FIG. 2 illustrates an exemplary embodiment of a method for selectively displaying information to the driver.

FIG. 2 outlines a method 200 for carrying out the subject matter of the present disclosure. The method 200 includes steps 202 to 210 describing a process for selectively displaying information on one or more display devices in a vehicle. The method is discussed in connection with FIG. 1, however, those skilled in the art will appreciate that the method 200 may be operable within any vehicle having known features and display modules.

The method 200 begins at step 202, where a set of parameters associated with the vehicle, driver, and surroundings are detected. As discussed in connection with FIG. 1, the sensors 104 and the vehicle/driver-provided systems 106 may identify vehicle and environmental information that the driver may wish to observe.

As step 204, the method 200 includes processing the detected parameters to generate displayable information. Processing may involve assembling the parameters associated with the driver, vehicle and surroundings to identify a set of information to be displayed. The processing step may also involve identifying driver's workload or attentiveness towards the road. To this end, the processing unit 102 observes environmental data captured by the sensors 104 and the user's current line of sight or head movement. The driver looking away from the road or shifting from the current lane may assist in deciding driver's state. This information may assist in deciding an appropriate display device.

Subsequently, the method 200 selects one or more display devices 110 to present the display elements, at step 206. This step is performed in router 112, which selects one or more display devices after analyzing present conditions. To this end, the router 112 first determines whether the driver is employing the wearable display 124, such as the spectacle type of display referred to above. If the wearable display 124 is detected, the router 112 ensures that most valuable information is presented on the spectacle device. In one embodiment of the method 200, all display elements are presented through the wearable display 124, allowing the driver to maintain complete attention on the road.

Those skilled in the art may, however, understand that the wearable display 124 presenting a number of varying display elements may sometimes distract the driver. This condition is mostly dependent on the driver's workload or environmental conditions such as fog, heavy rain, and heavy traffic. In case the workload is high, only safety-related information may be flashed on the wearable display 124 and additional information may be directed to the HUD 116 or the instrument cluster 122. Additionally, due to high workload, the router 112 may decide that information presented on the wearable display 124 does not vary frequently to avoid distracting the driver. In case the wearable display 124 is not detected, the router 112 selects other display devices 110 for suitably displaying information that keeps the driver informed without interfering with her view.

In another embodiment of the present disclosure, the router 112 may direct the display elements to one or more display devices 110 based on user's selection or preconfigured settings. The driver may also decide to receive particular information on a particular display device. The driver may implement that preference through the user interface 114 or the microphone that may include a voice recognition system to interpret verbal commands by the driver. For example, the driver may want to remove navigation display from the wearable display 124 and this request may be sent through a verbal command to the processing unit 102.

At step 208, the set of processed information is converted into displayable information based on the display device(s) 110 selected. The display control unit 108 generates corresponding display elements to be routed to one or more display devices 110. It should be evident that the generated display elements are adapted to the current line of sight of the driver.

Finally, at step 210 the display element is presented to the driver using the selected display device(s) 110. Those skilled in the art will understand that the router 112 continuously monitors the data gathered by the processing unit 102 to identify appropriate display device 120 based on driver, vehicle and surrounding conditions.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A method for displaying information in a vehicle, the method comprising:
    detecting a set of parameters associated with the vehicle, driver, or surroundings, including detecting a line of sight of the driver;
    processing the parameters to generate a set of information to be displayed;
    selecting one or more display devices to present the display elements based on a set of conditions
        the display devices including
            a wearable display;
            a head-up display;
            a center stack;
            an instrument cluster display; or
            display screens;
        the selecting step further including
            upon a determination that the wearable device has been selected,
            determining whether the wearable display device is available; and
            upon a determination that the wearable display is unavailable selecting another display device for presenting the display elements;
    generating display elements to be displayed using the set of information; and
    displaying the information using the display devices selected.

* * * * *